Figure 1:
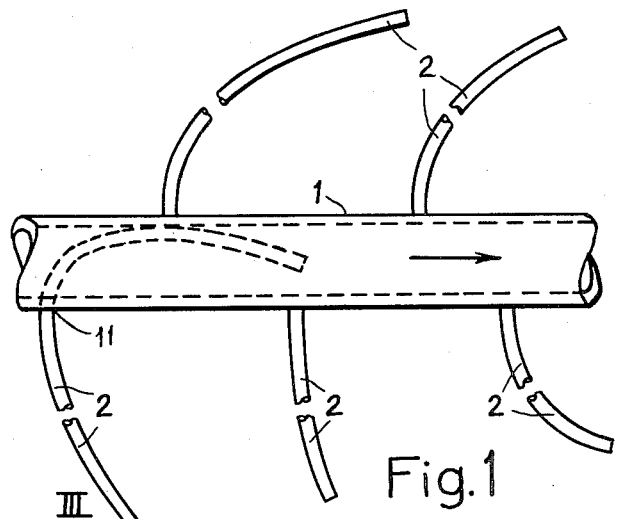

United States Patent Office 3,036,783
Patented May 29, 1962

3,036,783
WATERING PLANTS
Volmer Christian Hansen, Ballerup, Denmark (% Patentbureauerne, Banegaardspladsen 1, Copenhagen V, Denmark)
Filed July 21, 1960, Ser. No. 44,477
4 Claims. (Cl. 239—548)

The invention relates to a drip watering plant comprising a main tube or hose having a number of longitudinally spaced outlet members, the flow resistance of which is large enough to produce a very slow water discharge in the form of drips.

In some of the known drip watering plants of the type referred to the outlet or drip members are constituted by nozzles having a comparatively small length and a very small cross section area. Such nozzles are very easily clogged by impurities in the water, whereby the watering becomes irregular.

A certain improvement can be obtained by using helical nozzles in which the water flows in spirals between a screw and a thread hole in the nozzles body. In this manner a longer flow path is obtained and it is consequently possible to use a somewhat larger cross sectional area, whereby the tendency of clogging is reduced. However, the known helical nozzles suffer from another serious drawback as their water resistance is extremely fluctuating, whereby the watering becomes very uneven and unreliable. This is due to the fact that the screw must have a certain clearance in relation to the thread hole in the nozzle body in order to allow the water to flow through. If for instance the screw moves from a central position to abutment against one side of the thread hole the total flow resistance will be strongly reduced whereby the water flow through the nozzle will be unduly increased. This drawback has prevented any wide use of helical nozzles in drip watering plants.

The object of the invention is to provide a drip watering plant of the kind referred to in which the outlet members have no tendency of being clogged and at the same time have a definitely fixed flow resistance.

According to the invention this has been obtained in the way that each outlet member has a flow channel surrounded by firm walls and having substantially a constant cross section throughout the length, i.e. without any narrowing, whereby the diameter of the channel is large enough to avoid any risk of clogging due to impurities in the water, e.g. from 0.1 to 2.5 millimeters the length of the channel being great enough to produce the said flow resistance, e.g. at least 50 times the diameter.

As will be seen, fairly long and not too thin channels without any kind of narrowings are used whereby the risk of clogging has been completely eliminated. Moreover, the quantity of water flowing through these channels will in practice remain constant provided that the water pressure is constant.

According to the invention the outlet members may be made exclusively from thin tubes or hoses. By this arrangement, a simple and cheap structure is obtained by which a desired quantity of water per unit of time is easily adjusted by gradually cutting off pieces of a thin hose having surplus resistance. When the desired quantity of drip water is obtained by such shortening of the hose, all the other hoses are given the same length, and a quick and simple adjustment has thus been achieved.

If the main tube is made of elastic plastic material, the thin tubes or hoses may also be made of elastic plastic material and may be inserted into appropriate holes in the main tube. By this arrangement, an exceedingly simple and cheap construction is obtained as the material for the main hose as well as for the outlet hoses may be standard goods, so that no other work is required than the drilling of the holes in the main hose.

According to the invention a portion of the thin tubes or hoses may be received in the main tube extending in the interior of the same in a longitudinal direction and pointing away from the water supply end. This construction is particularly favourable when water with relatively many solid impurities is used, because the risk of clogging is least when the openings of the outlet hoses are directed away from the water flow in the main hose. Furthermore the holes receiving the thin hoses may be drilled obliquely into the wall of the main tube being directed away from the water supply end of the main tube. In this manner the insertion of the thin hoses is facilitated, as the inner wall of the main tube opposite the hole will deflect each hose in the desired direction on account of the inclined direction of the hole. Moreover, the main hose with the thin hose pieces can be drawn more easily through rows of plants than a main hose with hose pieces extending at right angles therefrom.

In a special embodiment according to the invention, the narrow flow channels of the outlet members are located in the wall of the main tube. In this manner the laterally extending tubes or hoses can be dispensed with so that the placing of the main tube in the rows of plants is made considerably easier, and the storing of the main tube will cause considerably less difficulty.

The invention may also be used for other liquid dispensing plants than drip watering plants.

Figure 2:
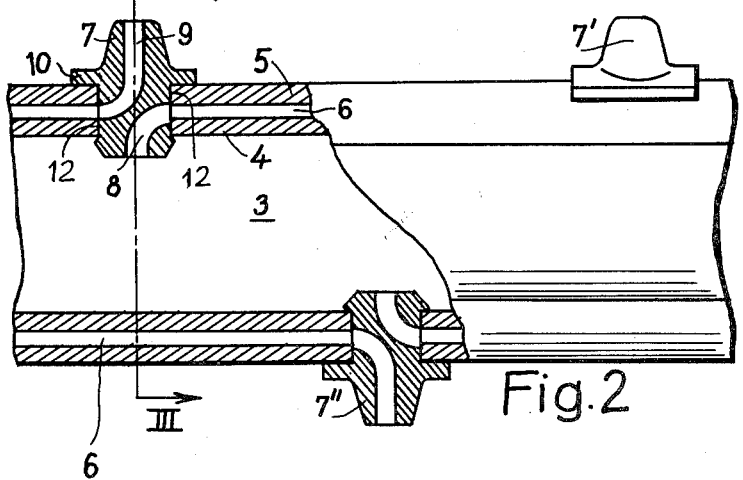
Figure 3:
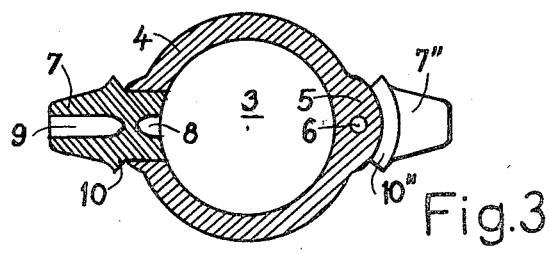

The invention will now be explained in detail with reference to the drawing, in which:

FIG. 1 shows schematically an embodiment of the arrangement according to the invention, and FIGS. 2 and 3 another embodiment, seen in longitudinal section and in section along the line III—III in FIG. 2, respectively.

The embodiment shown in FIG. 1 comprises a main tube 1 which may be made of plastic material and may have a clearance diameter of e.g. 10 mm. or more. In the tube 1 along two oppositely positioned longitudinal lines are drilled a number of holes or outlet members 11 in staggered relationship. Into these holes or outlet members 11 are inserted thin hose pieces or nozzle means 2 of considerable length and being made of plastic material.

These hose pieces or nozzle means 2 may have a clearance diameter of e.g. 1 mm. and thus have a comparatively small flow resistance per centimeter, but they have at the same time a considerable length, for instance 30–100 cm. It is thus possible to obtain the required large flow resistance which will allow only very small quantities of water to drip from the hose pieces.

The embodiment illustrated in FIGS. 2 and 3 differs from the one mentioned above by not having the outwardly extending thin hose pieces. A main tube indicated by 3 has in its wall 4 two longitudinal beads 5 with internal channels 6. In the tube wall is a number of openings or outlet members suitably interspaced and provided with stoppers or nozzle means. In FIG. 2 is shown two stoppers or nozzle means 7 and 7' traversing one of the channels 6 and a stopper or nozzle means 7" traversing the other channel 6. Each stopper has two mutually separated curved flow channels 8 and 9. The flow channel 8 extends from the interior of the tube 3 to the channel 6 at one side of the stopper, while the other flow channel 9 extends from the exterior to the same channel 6 at the other side of the stopper.

The stoppers have such a diameter that the channels 6 are completely barred by the stoppers. Thus between each pair of stoppers or nozzle means, e.g. between the stoppers or nozzle means 7 and 7' there is established a flow channel consisting of the portion of the channel 6 located between the stoppers, the flow channel 8 in the stopper 7 and the flow channel 9 in the stopper 7'.

Two channels 6 are shown in FIGS. 2 and 3, but it is also possible to use only one of these channels, or possibly more than two channels. The latter arrangement is used when a large flow resistance and therefore a considerable distance between two stoppers in the same channel 6 is required likewise as a large number of outlet openings.

The stoppers may be cast from a suitable plastic material and may be provided with a collar 10 to ensure a correct depth of insertion in the tube wall. Moreover, the stoppers may be provided with a mark indicating their correct angular position. If the stoppers are made from a transparent material, this mark may be dispensed with, as it will be possible to see the direction of the flow channels 8 and 9.

I claim:

1. A drip watering plant comprising a main tube having a number of longitudinally spaced outlet members, a nozzle means connected to each of the spaced outlet members having a flow resistance which is large enough to produce a very slow water discharge in the form of a drip, the nozzle means being characterized in that each has a flow channel surrounded by firm walls and substantially a constant cross-section throughout the length, said nozzle flow channel having a diameter of 0.1 to 2.5 millimeters whereby the diameter of the channel is large enough to avoid any risk of clogging due to impurities in the water, the length of said channel being at least fifty times the diameter, whereby the length and diameter ratio produces the said flow resistance.

2. A drip watering plant as claimed in claim 1, characterized in that the nozzle means are made exclusively from thin tubes or hoses.

3. A drip watering plant as claimed in claim 2, characterized in that a portion of the thin tubes or hoses are received in the main tube extending in the interior of the same in a longitudinal direction and pointing away from the water supply end.

4. A drip watering plant as claimed in claim 1, characterized in that the flow channels of the nozzle means are located in the wall of the main tube.

References Cited in the file of this patent

UNITED STATES PATENTS

| | | |
|---|---|---|
| 1,989,525 | Moore | Jan. 29, 1935 |
| 2,314,525 | Summers | Mar. 23, 1943 |
| 2,598,961 | Andrus | June 3, 1951 |
| 2,621,075 | Sedar | Dec. 9, 1952 |

FOREIGN PATENTS

| | | |
|---|---|---|
| 16,945 | Denmark | Jan. 24, 1913 |
| 143,378 | Australia | Sept. 13, 1951 |
| 1,199,358 | France | June 22, 1959 |